United States Patent

Taguchi et al.

(12) United States Patent
(10) Patent No.: US 6,835,680 B2
(45) Date of Patent: Dec. 28, 2004

US006835680B2

(54) CERAMIC COLOR COMPOSITION AND CERAMIC COLOR PASTE

(75) Inventors: Shuji Taguchi, Fukushima (JP); Shiro Ootaki, Fukushima (JP); Toru Kudo, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/793,858

(22) Filed: Mar. 8, 2004

(65) Prior Publication Data

US 2004/0171472 A1 Sep. 2, 2004

Related U.S. Application Data

(63) Continuation of application No. PCT/JP02/11945, filed on Nov. 15, 2002.

(30) Foreign Application Priority Data

Nov. 15, 2001 (JP) ........................................ 2001-350072

(51) Int. Cl.$^7$ .............................. C03C 8/14; C03C 8/12
(52) U.S. Cl. ...................... 501/20; 428/428; 428/426; 501/21; 501/26; 501/32; 427/374.7; 427/376.2; 427/376.4
(58) Field of Search .............................. 501/20, 21, 26, 501/32; 428/426, 428; 427/374.7, 376.2, 376.4

(56) References Cited

U.S. PATENT DOCUMENTS

| | | |
|---|---|---|
| 6,287,996 B1 | 9/2001 | Chiba et al. |
| 6,387,513 B1 | 5/2002 | Beyrle et al. |
| 2002/0197408 A1 * | 12/2002 | Beyrle et al. ............ 427/376.2 |

FOREIGN PATENT DOCUMENTS

| | | |
|---|---|---|
| EP | 1 078 895 A2 | 2/2001 |
| JP | 2000-505772 | 5/2000 |
| JP | 2000-154037 | 6/2000 |
| JP | 2001-89189 | 4/2001 |
| WO | WO 98/25864 | 6/1998 |

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

A ceramic color composition comprising, as represented by mass percentage, from 60 to 85% of a low melting point glass powder, from 15 to 40% of a heat-resistant pigment powder, from 0 to 15% of heat-resistant whiskers, and from 0 to 15% of a refractory powder, wherein $Fe_3O_4$: 1 to 35%, $MnO_2$: 1 to 24%, $Cr_2O_3+CuO \geq 1\%$, and $Cr_2O_3/8.5+CuO/23+NiO/3.3+CoO/0.71+V_2O/56+Se/0.45 \leq 1\%$.

4 Claims, No Drawings

CERAMIC COLOR COMPOSITION AND CERAMIC COLOR PASTE

This application is a continuation of PCT/JP02/11945 filed Nov. 15, 2002.

TECHNICAL FIELD

The present invention relates to a ceramic color composition which, after use, is suitable for reuse as a glass material, and a process for producing a ceramic color layer-coated glass plate suitable for such reuse.

BACKGROUND ART

Along the inside peripheral portion of a window glass of an automobile, a ceramic color layer is formed as an opaque colored layer. Such a ceramic color layer is provided so that it is present between a urethane sealant to hold the window glass along its periphery from the inside of the car and the window glass to be thereby held, in order to prevent deterioration of the urethane sealant by ultraviolet rays or to prevent terminals of heating wires, etc. provided at the inside peripheral portion of the window glass from being seen from outside.

For such a ceramic color layer, a ceramic color composition comprising a low melting point glass powder and a heat-resistant pigment powder as essential components, is formed into a paste, which is coated on a glass plate, followed by drying and firing so that it is fired to the glass plate, whereby a ceramic color layer-attached glass plate is produced. Further, as the heat-resistant pigment powder, a black one is usually employed.

Heretofore, when such an automobile has been disused, the ceramic color layer-attached glass plate used as a window glass of the automobile, has been crushed and disposed by e.g. landfill.

In recent years, in order to reduce the environmental load, it is desired to recover and not to dispose the ceramic color layer-attached glass plate of a disused automobile and to reuse it as a material (cullet) for a glass melting furnace to produce a glass plate.

As a ceramic color composition which can be reused in such a manner, JP-A-2000-505772 discloses a ceramic color composition using a manganese compound as a heat-resistant pigment powder, or JP-A-2001-89189 discloses a ceramic color composition using $(Fe, Mn)_2O_3$ of a Bixbyite structure as a heat-resistant pigment powder. However, a ceramic color layer-attached glass plate using such a ceramic color composition has had a problem such that the sinterability of the ceramic color layer is low, or the ceramic color layer looks whitish as observed through the glass plate from the side on which no ceramic color layer is fired.

It is an object of the present invention to provide a ceramic color composition which can be reused, a ceramic color paste and a process for producing a ceramic color layer-attached glass plate which can be reused, whereby such problems can be solved.

DISCLOSURE OF THE INVENTION

The present invention provides a ceramic color composition consisting essentially of, as represented by mass percentage, from 60 to 85% of a low melting point glass powder, from 15 to 40% of a heat-resistant pigment powder, from 0 to 15% of heat-resistant whiskers, and from 0 to 15% of a refractory powder, characterized in that as represented by mass percentage, the Fe content $C_{Fe}$ based on $Fe_3O_4$ (hereinafter referred to as the $Fe_3O_4$ content) is from 1 to 35%, and the Mn content $C_{Mn}$ based on $MnO_2$ (hereinafter referred to as the $MnO_2$ content) is from 1 to 24%, that at least one of the Cr content $C_{Cr}$ based on $Cr_2O_3$ (hereinafter referred to as the $Cr_2O_3$ content) and the Cu content $C_{Cu}$ based on CuO (hereinafter referred to as the CuO content) is not 0%, and $C_{Cr}+C_{Cu}$ is at least 1%, that each of the Ni content $C_{Ni}$ based on NiO (hereinafter referred to as the NiO content), the Co content $C_{Co}$ based on CoO (hereinafter referred to as the CoO content), the V content $C_V$ based on $V_2O_5$ (hereinafter referred to as the $V_2O_5$ content) and the Se content $C_{Se}$, is 0% or larger than 0%, and that $C_{Cr}$, $C_{Cu}$, $C_{Ni}$, $C_{Co}$, $C_V$ and $C_{Se}$ satisfy the following formula 1:

$$C_{Cr}/8.5+C_{Cu}/23+C_{Ni}/3.3+C_{Co}/0.71+C_V/56+C_{Se}/0.45 \leq 1\% \quad \text{Formula 1}$$

Further, the present invention provides a ceramic color paste comprising a binder, an organic solvent and the above ceramic color composition.

Further, the present invention provides a process for producing a ceramic color layer-coated glass plate (hereinafter referred to as a process for producing the glass plate of the present invention), characterized by coating and firing the above ceramic color composition on a glass plate to form a ceramic color layer fired to the glass plate.

When a ceramic color layer-attached glass plate is re-used as a material (cullet) for a glass melting furnace, it is possible that a coloring component contained in the ceramic color layer deteriorates the visible light transmittance of a glass plate which is produced by the glass melting furnace, thereby leading to a quality trouble. The present inventors have studied this point as follows and have arrived at the present invention.

The material for a glass melting furnace usually comprises cullet and a batch having industrial material such as silica sand mixed, and the ratio of such a batch is at least 0.2.

A glass plate to be used for e.g. a window glass of an automobile, is produced by a float process. Namely, molten glass is formed into a glass ribbon in a float bath and after being annealed, cut into a desired length, and both edge portions are also cut off to obtain a glass plate. When this glass plate is to be used for a window glass of an automobile, the peripheral portion or the like will be further cut off, as the case requires, to obtain a desired shape. The glass thus cut off will be recovered and re-used as cullet (such cullet will hereinafter be referred to as plant cullet). In the production of a window glass for an automobile, the ratio c1 of plant cullet is at least 0.4 of the molten glass.

Accordingly, when a ceramic color layer-attached glass plate recovered from a disused automobile is used as cullet (such cullet recovered from a disused automobile will hereinafter be referred to as scrap car cullet), its ratio c2 is at most 0.4 (=1−0.2−0.4). Here, c2=0.4 corresponds to a case where the recovery rate of the scrap car cullet is 100%. However, from the viewpoint of reuse, such a recovery rate is required to be at least 60% even if it may not be 100%. Namely, c2 must be at least 0.24 (=0.4×60%).

On the other hand, as a result of an investigation, it has been found that the mass of a ceramic color layer fired on a window glass used for an automobile is from 30 to 35 g per automobile, which corresponds to from 0.0007 to 0.001 of the mass of the window glass.

Accordingly, when the content of a coloring component X in the ceramic color layer is represented by x, the content x' of X in the window glass of an automobile is 0.001×x at the maximum.

If it is started to use scrap car cullet as a material for a melting furnace for a window glass of an automobile, the content of the coloring component X will increase. As such use is repeated, the content of the coloring component X will gradually increase, but the increasing ratio will gradually decrease, and the content of X in the window glass of an automobile will eventually approaches a constant value of $\Delta x'$.

$\Delta x'$ may be calculated as follows. Namely, in the plant cullet formed firstly after the initiation of use of scrap car cullet, such scrap car cullet is contained in a proportion of ratio c2. If such plant cullet and scrap car cullet are used in ratios of c1 and c2, respectively, in plant cullet to be formed next, scrap car cullet will be contained in a proportion of c1×c2+c2=c2 (1+c1). This plant cullet and the scrap car cullet are used in ratios of c1 and c2, respectively, in plant cullet to be formed next, scrap car cullet will be contained in a proportion of c1×c2(1+c1)+c2=c2(1+c1+c1×c1). If this is repeated infinitely, since c1 is less than 1, in plant cullet, scrap car cullet will be contained in a proportion of cf=c2/(1−c1).

On the other hand, as mentioned above, c1 is 0.4, and accordingly, when the scrap car cullet recovery is 60%, c2 is 0.24, and cf is 0.4. Further, as mentioned above, the content of X in scrap car cullet is 0.001×x at the maximum. Accordingly, the content of X in plant cullet containing the above scrap car cullet in a proportion of cf, is 0.0004×x at the maximum. The content of X in this plant cullet is the above-mentioned content $\Delta x'$ of X in the window glass of an automobile, $\Delta x'$=0.0004×x.

The most serious as an influence by the increase by $\Delta x'$ of the content of the coloring component X, is a change in the optical characteristics of the window glass of the automobile. The present inventors have studied those having large absorptivities among coloring components conceivable as X, i.e. Fe, Mn, Cr, Cu, Ni, Co, V, Ti and Se. Further, with respect to the change in optical characteristics, it has been made a requirement that as a coloring agent, the change in visible light transmittance Tv of a green color soda lime silica glass (thickness: 5 mm) containing 0.5% of $Fe_2O_3$ will be at most 1%. Here, Tv is calculated in accordance with JIS R3106, 3.4 "Calculation of the visible light transmittance and the visible light reflectance of a single plate of glass" except that as standard light, standard light of A prescribed in JIS Z8720, 3.2, is used.

As a result of studying the above respective components individually, it has been found that it is unnecessary to take an influence of Fe, Mn or Ti over Tv into consideration, and with respect to Cr, Cu, Ni, Co, V and Se, from the viewpoint of the respective independent influences thereof, $Cr_2O_3$ content≦8.5%, CuO content≦23%, NiO content≦3.3%, CoO content≦0.71%, $V_2O_5$ content≦56%, and Se content≦0.45%.

Accordingly, taking into consideration a case where the respective components are used in combination when the scrap car cullet recovery rate is 60%, it is considered that ($Cr_2O_3$/8.5+CuO/23+NiO/3.3+CoO/0.71+$V_2O_5$/56+Se/0.45) (this will hereinafter be referred to as Q) wherein the $Cr_2O_3$ content, etc. are simply represented by $Cr_2O_3$, etc., is only required to be at most 1%, and thus, the present invention has been accomplished.

BEST MODE FOR CARRYING OUT THE INVENTION

The contents in the present invention are represented by mass percentage unless otherwise specified.

In the present invention, the content of Fe based on $Fe_3O_4$ is the content obtained on the assumption that Fe is present in the form of $Fe_3O_4$. The same applies to the contents of other components.

Further, in this specification, for example, the $Fe_3O_4$ content is represented by $C_{Fe}$, or may simply be represented by $Fe_3O_4$. The same applies to the contents of other components.

The $Fe_3O_4$ content in the ceramic color composition of the present invention corresponds to the $Fe_3O_4$ content in a fired product obtained by firing the composition and can be obtained, for example, by employing an X-ray fluorescence method with respect to the composition. The same applies to the contents of other components.

In this specification, a low melting point glass is a glass having a softening point $T_S$ of not higher than 650° C. $T_S$ is preferably not higher than 600° C.

The ceramic color composition of the present invention is usually kneaded with a binder such as ethyl cellulose and an organic solvent such as α-terpineol to form a paste, which is then coated on a glass plate, followed by drying and then by firing to form a ceramic color layer fired on the soda lime silica glass plate. Here, the one formed into a paste is the ceramic color paste of the present invention.

Typically, the above coating is carried out by screen printing, and the above drying is carried out at a temperature of from 80 to 140° C. for from 5 to 15 minutes, and the above firing is carried out at a temperature of from 630 to 700° C. for from 3 to 8 minutes.

At the time of firing the ceramic color composition of the present invention to the glass plate by the above firing, the glass plate may simultaneously be subjected to bending to form a bent glass plate for laminated glass, or after the bending, the curved glass plate may be quenched to obtain a reinforced bent glass plate. The bending for such a bent glass plate for laminated glass or a reinforced bent glass plate is carried out typically at 630° C. for 4 minutes or at 670° C. for 4 minutes, respectively. Under such a condition, the ceramic color composition of the present invention is subjected to bending and at the same time fired to the glass plate to form a ceramic color layer. The method for producing a ceramic color layer-attached glass plate, described here, is the process for producing a glass plate of the present invention.

Now, the $Fe_3O_4$ content, the $MnO_2$ content, the $Cr_2O_3$ content, the CuO content, the NiO content, the CoO content, the $V_2O_5$ content and the Se content in the ceramic color composition of the present invention will be described.

If the $Fe_3O_4$ content is less than 1%, the opacity of the ceramic color layer tends to deteriorate. It is preferably at least 3%, more preferably at least 5%. If it exceeds 35%, the fluidity at the time of firing tends to deteriorate. It is preferably at most 24%, more preferably at most 15%.

If the $MnO_2$ content is less than 1%, the opacity of the ceramic color layer tends to deteriorate. It is preferably at least 4%, more preferably at least 7%. If it exceeds 24%, the fluidity at the time of firing tends to deteriorate. It is preferably at most 19%, more preferably at most 15%.

$Fe_3O_4$+$MnO_2$ is preferably from 5 to 30%. If it is less than 5%, the opacity of the ceramic color layer is likely to deteriorate. It is more preferably at least 10%, particularly preferably at least 15%. If it exceeds 30%, the fluidity at the time of firing is likely to deteriorate. It is more preferably at most 27%, particularly preferably at most 24%.

One of the $Cr_2O_3$ content and the CuO content may be 0%, but $Cr_2O_3$+CuO must be at least 1%. If it is less than 1%, the ceramic color layer tends to look whitish as observed through the glass plate from the side on which no ceramic color layer is fired (hereinafter referred to as a non-printed side). It is preferably at least 3%. Further, $Cr_2O_3+CuO$ is preferably at most 10%, more preferably at most 7%.

Each of the NiO content, the CoO content, the $V_2O_5$ content and the Se content, may be 0% or may not be 0%.

$Q=Cr_2O_3/8.5+CuO/23+NiO/3.3+CoO/0.71+V_2O_5/56+Se/0.45$ must be at most 1%, as mentioned above. If it exceeds 1%, in a case where the scrap car cullet recovery is 60%, the change in optical characteristics of the widow glass for an automobile produced by using this scrap car cullet, tends to be large, whereby reuse of the scrap car cullet tends to be difficult. It is preferably at most 0.6%, more preferably at most 0.5%. Further, when Q is less than 0.5%, the above change in the optical characteristics can be made small even if the scrap car cullet recovery is 90%.

The $Fe_3O_4$ content, the $MnO_2$ content, the $Cr_2O_3$ content, the CuO content, the NiO content, the CoO content, the $V_2O_5$ content and the Se content in the ceramic color composition of the present invention have been described, and now the contents of typical components other than these will be described. Namely, $SiO_2$: 5 to 31%, $Bi_2O_3$: 0 to 52%, ZnO: 0 to 31.5%, $B_2O_3$: 0 to 10%, $SiO_2+B_2O_3$: 5 to 41%, $TiO_2$: 0 to 8%, $Li_2O+Na_2O+K_2O$: 0 to 21%, $CeO_2$: 0 to 2%, $Al_2O_3$: 0 to 7%, BaO: 0 to 8%, and $MoO_3$: 0 to 1%.

Now, the respective constituting components of the ceramic color composition of the present invention will be described.

The low melting point glass powder is a component which lets the ceramic color layer be fired to the glass plate and thus is essential. If it is less than 60%, firing tends to be inadequate. It is preferably at least 65%. If it exceeds 85%, the content of the heat resistant pigment powder will be small. It is preferably at most 80%.

$T_S$ of the low melting point of glass powder is preferably from 540 to 580° C., and its average linear expansion coefficient $\alpha$ within a range of from 50 to 350° C. is preferably from $50\times10^{-7}/°$ C. to $130\times10^{-7}/°$ C. If $T_S$ is outside the above range, firing to a soda lime silica glass plate commonly used as a window glass of an automobile (typically, $T_S=730°$ C., $\alpha=87\times10^{-7}/°$ C.) is likely to be difficult, and if $\alpha$ is outside the above range, deterioration of the strength of the glass plate is likely to be substantial.

Further, in a case where the present invention is applied to press-molded bent glass plate, the low melting point glass powder is preferably one which will be crystallized at the time of firing. If it is one which will not be crystallized at the time of firing, the mold releasability is likely to be poor. Crystals which precipitate at the time of the above firing may, for example, be bismuth silicate crystals or zinc silicate crystals, and the crystallization peak temperature $T_C$ which is observed at the time of precipitation of such crystals in the differential thermal analysis, is preferably from 580 to 650° C.

It is preferred that the low melting point glass powder consists essentially of, as represented by mass percentage of the following components:

| | |
|---|---|
| $SiO_2$ | 7 to 45%, |
| $Bi_2O_3$ | 10 to 75%, |
| ZnO | 0 to 45%, |
| $B_2O_3$ | 0 to 15%, |
| $TiO_2$ | 0 to 12%, |
| $ZrO_2$ | 0 to 10%, |
| $Al_2O_3$ | 0 to 10%, |

| -continued | |
|---|---|
| MgO | 0 to 5%, |
| CaO | 0 to 5%, |
| BaO | 0 to 12%, |
| $Li_2O$ | 0 to 10%, |
| $Na_2O$ | 0 to 10%, |
| $K_2O$ | 0 to 10%, |
| $CeO_2$ | 0 to 3%, |
| F | 0 to 2%, and |
| PbO | 0 to 50%. |

Components other than the above components may be incorporated within a range not to impair the purpose of the present invention, but the total of contents of such components is preferably at most 5%, more preferably at most 3%.

In order to reduce the load to the environment, the PbO content in the low melting point glass is preferably made to be 0%.

In this specification, the content of a certain component being at least 0% means that such a component is not essential. For example, "ZnO: 0 to 45%" means "ZnO is not essential, but may be contained up to 45%".

In a case where the present invention is applied to a bent glass plate formed by bending i.e. not by press molding, e.g. a bent glass plate for laminated glass, it is more preferred that the low melting point of glass powder consists essentially of $SiO_2$: 20 to 40%, $Bi_2O_3$: 15 to 45%, ZnO: 0 to 25%, $B_2O_3$: 0 to 15%, $TiO_2$: 0 to 5%, $ZrO_2$: 0 to 5%, $Al_2O_3$: 0 to 5%, MgO: 0 to 5, CaO: 0 to 5%, BaO: 0 to 5%, $Li_2O$: 0 to 10%, $Na_2O$: 0 to 10%, $K_2O$: 0 to 10%, $CeO_2$: 0 to 3%, and F: 0 to 2%.

It is particularly preferred that it consists essentially of $SiO_2$: 22 to 35%, $Bi_2O_3$: 25 to 43%, ZnO: 0 to 20%, $B_2O_3$: 0 to 12%, $TiO_2$: 0 to 4%, $ZrO_2$: 0 to 3%, $Al_2O_3$: 0 to 3%, MgO: 0 to 3%, CaO: 0 to 3%, BaO: 0 to 3%, $Li_2O$: 0 to 7%, $Na_2O$: 0 to 7%, $K_2O$: 0 to 5%, $CeO_2$: 0 to 2%, and F: 0 to 1%.

In a case where the present invention is applied to a press molded bent glass plate, the low melting point of glass powder is more preferably one which consists essentially of $SiO_2$: 10 to 45%, $Bi_2O_3$: 15 to 40%, ZnO: more than 25 to 45%, $B_2O_3$: 0 to 10%, $TiO_2$: 0 to 5%, $ZrO_2$: 0 to 5%, $Al_2O_3$: 0 to 5%, MgO: 0 to 5%, CaO: 0 to 5%, BaO: 0 to 5%, $Li_2O$: 0 to 10%, $Na_2O$: 0 to 10%, $K_2O$: 0 to 7%, $CeO_2$: 0 to 3%, and F: 0 to 2% and which precipitates crystals when fired at a temperature of from 650 to 680° C.

It is particularly preferably one which consists of $SiO_2$: 20 to 40%, $Bi_2O_3$: 20 to 30%, ZnO: 30 to 40%, $B_2O_3$: 0 to 5%, $TiO_2$: 0 to 3%, $ZrO_2$: 0 to 3%, $Al_2O_3$: 0 to 3%, MgO: 0 to 3%, CaO: 0 to 3%, BaO: 0 to 3%, $Li_2O$: 0 to 7%, $Na_2O$: 0 to 7%, $K_2O$: 0 to 5%, $CeO_2$: 0 to 2%, and F: 0 to 1% and which precipitates $Zn_{1.7}SiO_4$ crystals when fired at a temperature of from 650 to 680° C.

In a case where the present invention is applied to a press molded bent glass plate, as another preferred embodiment, the low melting point glass powder is one which consists essentially of $SiO_2$: 10 to 38%, $Bi_2O_3$: 50 to 75%, $B_2O_3$: 0 to 8%, $TiO_2$: 0 to 12%, $ZrO_2$: 0 to 10%, $Al_2O_3$: 0 to 10%, BaO: 0 to 12%, $Li_2O$: 0 to 10%, $Na_2O$: 0 to 10%, $K_2O$: 0 to 5%, $CeO_2$: 0 to 3%, and F: 0 to 2% and which precipitates crystals when fired at a temperature of from 650 to 680° C.

It is particularly preferably one which consists of $SiO_2$: 25 to 36%, $Bi_2O_3$: 50 to 60%, $B_2O_3$: 0 to 5%, $TiO_2$: 0 to 10%, $ZrO_2$: 0 to 7%, $Al_2O_3$: 0 to 7%, BaO: 0 to 10%, $Li_2O$: 0 to 5%, $Na_2O$: 0 to 5%, $K_2O$: 0 to 3%, $CeO_2$: 0 to 2%, and F: 0 to 1% and which precipitates bismuth silicate crystals when fired at a temperature of from 650 to 680° C.

Now, components of the ceramic color composition of the present invention, other than the low melting point glass powder, will be described.

The heat-resistant pigment powder is a component which shields ultraviolet rays and also shields visible light and thus is essential. If it is less than 15%, the ultraviolet ray-shielding effect or the visible light-shielding effect tends to be inadequate. It is preferably at least 18%. If it exceeds 40%, firing tends to be inadequate. It is preferably at most 35%.

The heat-resistant pigment powder preferably contains at least one of Cr and Cu, and Fe and Mn. It is more preferably a powder composed mainly of e.g. a copper/chromium double oxide, an iron/manganese double oxide or magnetite, or a black pigment powder which is a mixture of such powders. Particularly preferred is one comprising a copper/chromium/manganese composite oxide powder and an iron/manganese double oxide powder.

The heat-resistant whiskers are not essential, but may be contained up to 15% to suppress deterioration of the strength of the glass plate due to the formation of the ceramic color layer. If it exceeds 15%, the fluidity at the time of firing tends to deteriorate, whereby firing tends to be inadequate. It is preferably at most 10%, more preferably at most 7%.

The heat-resistant whiskers are inorganic whiskers which have a melting point of 700° C. and wherein the fiber diameters are from 0.1 to 10 μm, the fiber lengths are from 0.5 to 100 μm, and the fiber diameters/fiber lengths is from 0.001 to 2. Typically, the melting point is at least 1000° C., the fiber diameters are from 0.5 to 5 μm, the fiber lengths are from 5 to 50 μm, and the fiber diameters/the fiber lengths is from 0.01 to 0.1.

The heat-resistant whiskers are preferably whiskers of at least one inorganic substance selected from the group consisting of aluminum borate, α-alumina, potassium titanate, zinc oxide, magnesium oxide, magnesium borate, basic magnesium sulfate and titanium diboride, and they are more preferably aluminum borate whiskers.

The refractory powder is not essential, but may be contained up to 15% to adjust the expansion coefficient of the fired product. If it exceeds 15%, the fluidity at the time of firing tends to deteriorate, whereby firing tends to be inadequate. It is preferably at most 10%, more preferably at most 5%. The refractory powder is a refractory powder having a melting point of at least 700° C., which is not inorganic whiskers. It may, for example, be a boride powder, a nitride powder or a silicide powder which has a melting point of at least 700° C. and which is not inorganic whiskers, or a powder of an oxide such as α-alumina, α-quartz, zircon, cordierite, β-eucryptite, forsterite, mullite or steatite, which is not inorganic whiskers.

The ceramic color composition of the present invention consists essentially of the above described components, but may contain other components within a range not to impair the purpose of the present invention. As such other components, a Si powder may be mentioned. Further, the total of contents of such other components is preferably at most 5%, more preferably at most 3%.

Materials were formulated and mixed to have a composition shown by mass percentage in lines for from $SiO_2$ to $CeO_2$ in Table 1 and melted at 1250° C., followed by quenching to obtain flaky glass. Then, this flaky glass was pulverized by a ball mill to obtain a glass powder having a mass average particle diameter $D_{50}$ of 3.5 μm.

With respect to glass powders A, B and C thus obtained, differential thermal analyses were carried out by raising the temperature to 800° C. at a rate of 10° C./min, whereby the softening points $T_S$ (unit: ° C.) and the crystallization peak temperatures $T_C$ (unit: ° C.) were measured, and by means of a differential heat expansion meter, α (unit: $10^{-7}$/° C.) was measured. With respect to glass powder A, no crystallization peak was observed.

With respect to glass powders B and C having crystallization peaks observed, crystals precipitated when these glass powders were subjected to heat treatment at 670° C., were investigated by X-ray diffraction analyses, whereby the precipitated crystals of glass powder B were $Zn1.7SiO_4$, and the precipitated crystals of glass powder C were $Bi_2SiO_5$.

Then, such glass powder, a heat-resistant pigment powder and aluminum borate whiskers were formulated and mixed as shown by mass percentage in Table 2 to obtain a ceramic color composition.

As the glass powder, glass powder A was used in Examples 1 to 5, glass powder B was used in Examples 6 and 7, and glass powder C was used in Examples 8 and 9.

As the heat-resistant pigment powder, in Example 1, one obtained by mixing chromium/copper/manganese composite oxide type black colored heat-resistant pigment powder 42-302A ($D_{50}$=0.8 μm) manufactured by Ferro Enamels (Japan) Ltd. and iron/manganese/aluminum composite oxide type black-colored heat-resistant pigment powder 42-313A ($D_{50}$=2.8 μm) manufactured by the same company in a mass ratio of 1:4, was used.

In Examples 2, 6 and 8, one obtained by mixing chromium/copper/manganese composite oxide type black-colored heat-resistant pigment powder 42-303A ($D_{50}$=0.9 μm) manufactured by Ferro Enamels (Japan) Ltd. and the above-mentioned 42-313A in a mass ratio of 2:3, was used.

Further, in Example 3, the above-mentioned 42-313A was used alone, and in Examples 4, 7 and 9, manganese dioxide reagent powder manufactured by Kanto Chemical Co., Inc. was used alone. In Example 5, manganese carbonate reagent powder manufactured by Junsei Chemical Co., Ltd. was used alone.

As the aluminum borate whiskers, ALBOREX YS10 manufactured by Shikoku Kasei Corporation was used. The composition of ALBOREX YS10 is $9Al_2O_3 \cdot 2B_2O_3$, and its fiber diameter is from 0.5 to 5 μm, its fiber length is from 5 to 50 μm, and the fiber diameter/fiber length is from 0.01 to 1.

The compositions represented by mass percentage of these ceramic color compositions are shown in lines for from $Fe_3O_4$ to $MoO_3$ in Table 2. such compositions were obtained by calculation from the composition of the above-mentioned glass powder, the composition by the X-ray fluorescence analysis of the heat-resistant pigment powder and the composition of the above aluminum borate whiskers. Examples 1, 2, 6 and 8 are Examples of the present invention, and Examples 3, 4, 5, 7 and 9 are Comparative Examples.

Then, 20 parts by mass of an α-terpineol solution having 10% as represented by mass percentage of ethyl cellulose dissolved, was added to 80 parts by mass of the ceramic color composition, followed by kneading and uniformly dispersed by a triple roll mill to obtain a ceramic color paste (hereinafter referred to simply as a paste).

The paste thus obtained was screen-printed on the entire surface of a soda lime silica glass plate having a thickness of 3.5 mm and a size of 10 cm×10 cm and dried.

The glass plate thus having the paste coated was maintained for 4 minutes at 630° C. in Examples 1 to 5 or at 670° C. in Examples 6 to 9 for firing, and then cooled to room temperature to obtain a ceramic color layer-attached glass plate. With respect to this ceramic color layer-attached glass plate, the color difference ΔE and the sinterability were measured or evaluated as follows. The results are shown in the Table.

ΔE: The color difference between the standard colored glass plate (L*=21, a*=0.7, b*=−0.3) and the non-printed surface of the sample was measured by means of a color difference meter (CR-200, manufactured by Minolta K.K.). ΔE is preferably at most 1.0. If it exceeds 1.0, the ceramic color layer is likely to look whitish when observed from the non-printed side. It is more preferably at most 0.5.

Sinterability: A linear line having a width of 0.7 cm and a length of 9 cm was drawn on a ceramic color layer surface by means of an oil-based ink (marker ink), and the linear line was observed from the non-printed side to see whether or not the marker ink penetrated into the ceramic color layer. No penetration observed is identified by ○, penetration observed is identified by X.

TABLE 1

|  | A | B | C |
|---|---|---|---|
| $SiO_2$ | 30.9 | 35.2 | 35.0 |
| $Bi_2O_3$ | 28.3 | 21.4 | 53.0 |
| ZnO | 17.3 | 32.7 | 0 |
| $B_2O_3$ | 10.5 | 3.5 | 0 |
| $TiO_2$ | 2.9 | 0 | 5.3 |
| $Li_2O$ | 2.3 | 2.0 | 3.4 |
| $Na_2O$ | 5.0 | 4.0 | 0 |
| $K_2O$ | 0.8 | 0 | 2.0 |
| $CeO_2$ | 2.0 | 1.2 | 1.3 |
| Ts | 560 | 560 | 565 |
| Tc | — | 590 | 635 |
| α | 88 | 70 | 96 |

TABLE 2

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Glass | 70 | 70 | 70 | 70 | 70 | 70 | 70 | 70 | 70 |
| Heat-resistant pigment | 25 | 25 | 25 | 25 | 25 | 30 | 30 | 25 | 25 |
| Whisker | 5 | 5 | 5 | 5 | 5 | 0 | 0 | 5 | 5 |
| $Fe_3O_4$ | 9.7 | 7.4 | 12.1 | 0 | 0 | 8.9 | 0 | 7.4 | 0 |
| $MnO_2$ | 9.9 | 11.7 | 12.1 | 25.0 | 25.0 | 14.0 | 30.0 | 11.7 | 25.0 |
| $Cr_2O_3$ | 3.0 | 3.3 | 0 | 0 | 0 | 3.9 | 0 | 3.3 | 0 |
| CuO | 1.6 | 1.7 | 0 | 0 | 0 | 2.0 | 0 | 1.7 | 0 |
| $SiO_2$ | 21.7 | 21.8 | 21.7 | 21.6 | 21.6 | 24.8 | 24.6 | 24.6 | 24.5 |
| $Bi_2O_3$ | 19.8 | 19.8 | 19.8 | 19.8 | 19.8 | 15.0 | 15.0 | 37.1 | 37.1 |
| ZnO | 12.1 | 12.1 | 12.1 | 12.1 | 12.1 | 22.9 | 22.9 | 0 | 0 |
| $B_2O_3$ | 8.2 | 8.0 | 8.0 | 8.0 | 8.0 | 2.5 | 2.5 | 0.7 | 0.7 |
| $TiO_2$ | 2.0 | 2.0 | 2.0 | 2.0 | 2.0 | 0 | 0 | 3.7 | 3.7 |
| $Li_2O$ | 1.6 | 1.6 | 1.6 | 1.6 | 1.6 | 1.4 | 1.4 | 2.4 | 2.4 |
| $Na_2O$ | 3.5 | 3.5 | 3.5 | 3.5 | 3.5 | 2.8 | 2.8 | 0 | 0 |
| $K_2O$ | 0.6 | 0.6 | 0.6 | 0.6 | 0.6 | 0 | 0 | 1.4 | 1.4 |
| $CeO_2$ | 1.4 | 1.4 | 1.4 | 1.4 | 1.4 | 0.8 | 0.8 | 0.9 | 0.9 |
| $Al_2O_3$ | 4.9 | 4.8 | 5.0 | 4.3 | 4.3 | 0 | 0 | 4.8 | 4.3 |
| BaO | 0 | 0 | 0 | 0 | 0 | 0.1 | 0 | 0 | 0 |
| $MoO_3$ | 0 | 0.2 | 0 | 0 | 0 | 0.2 | 0 | 0.2 | 0 |
| Q | 0.42 | 0.46 | 0 | 0 | 0 | 0.55 | 0 | 0.46 | 0 |
| ΔE | 0.18 | 0.24 | 1.76 | 5.44 | 3.78 | 0.93 | 8.65 | 0.71 | 5.28 |
| Sinterability | ○ | ○ | ○ | X | X | ○ | X | ○ | X |

INDUSTRIAL APPLICABILITY

According to the present invention, it is possible to obtain a ceramic color layer-attached glass plate whereby sinterability of the ceramic color layer is excellent, the ceramic color layer as observed from the non-printed side does not look whitish, and which can be re-used as a material (cullet) for a glass melting furnace.

The entire disclosure of Japanese Patent Application No. 2001-350072 filed on Nov. 15, 2001 including specification, claims and summary is incorporated herein by reference in its entirety.

What is claimed is:

1. A ceramic color composition consisting essentially of, as represented by mass percentage, from 60 to 85% of a low melting point glass powder, from 15 to 40% of a heat-resistant pigment powder, from 0 to 15% of heat-resistant whiskers, and from 0 to 15% of a refractory powder, characterized in that as represented by mass percentage, the Fe content $C_{Fe}$ based on $Fe_3O_4$ is from 1 to 35%, and the Mn content $C_{Mn}$ based on $MnO_2$ is from 1 to 24%, that at least one of the Cr content $C_{Cr}$ based on $Cr_2O_3$ and the Cu content $C_{Cu}$ based on CuO is not 0%, and $C_{Cr}+C_{Cu}$ is at least 1%, that each of the Ni content $C_{Ni}$ based on NiO, the Co content $C_{Co}$ based on CoO, the V content $C_V$ based on $V_2O_5$ and the Se content $C_{Se}$, is 0% or larger than 0%, and that $C_{Cr}$, $C_{Cu}$, $C_{Ni}$, $C_{Co}$, $C_V$ and $C_{Se}$ satisfy the following formula 1:

$$C_{Cr}/8.5+C_{Cu}/23+C_{Ni}/3.3+C_{Co}/0.71+C_V/56+C_{Se}/0.45 \leq 1\% \quad \text{Formula 1.}$$

2. The ceramic color composition according to claim 1, wherein the low melting point glass powder consists essentially of, as represented by mass percentage of the following components:

| $SiO_2$ | 7 to 45%, |
|---|---|
| $Bi_2O_3$ | 10 to 75%, |
| ZnO | 0 to 45%, |
| $B_2O_3$ | 0 to 15%, |
| $TiO_2$ | 0 to 12%, |
| $ZrO_2$ | 0 to 10%, |
| $Al_2O_3$ | 0 to 10%, |
| MgO | 0 to 5%, |
| CaO | 0 to 5%, |
| BaO | 0 to 12%, |
| $Li_2O$ | 0 to 10%, |
| $Na_2O$ | 0 to 10%, |
| $K_2O$ | 0 to 10%, |
| $CeO_2$ | 0 to 3%, |
| F | 0 to 2%, and |
| PbO | 0 to 50%. |

3. A ceramic color paste comprising a binder, an organic solvent and the ceramic color composition as defined in claim 1.

4. A process for producing a ceramic color layer-coated is glass plate, characterized by coating and firing the ceramic color composition as defined in claim 1 on a glass plate to form a ceramic color layer fired to the glass plate.

* * * * *

UNITED STATES PATENT AND TRADEMARK OFFICE
CERTIFICATE OF CORRECTION

PATENT NO.     : 6,835,680 B2
DATED          : December 28, 2004
INVENTOR(S)    : Taguchi et al.

It is certified that error appears in the above-identified patent and that said Letters Patent is hereby corrected as shown below:

<u>Title page,</u>
Item [75], Inventors, should read:
-- [75]   Inventors:     Shuji Taguchi, Fukushima (JP)
                         Shiro Ohtaki, Fukushima (JP)
                         Toru Kudo, Kanagawa (JP) --

Signed and Sealed this

Fifth Day of April, 2005

JON W. DUDAS
*Director of the United States Patent and Trademark Office*